United States Patent
Hu et al.

(10) Patent No.: US 12,372,660 B2
(45) Date of Patent: Jul. 29, 2025

(54) IDENTIFICATION OF PLANAR POINTS IN LIDAR POINT CLOUD OBTAINED WITH VEHICLE LIDAR SYSTEM

(71) Applicant: GM Global Technology Operations LLC, Detroit, MI (US)

(72) Inventors: Yao Hu, Sterling Heights, MI (US); Xinyu Du, Oakland Township, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1011 days.

(21) Appl. No.: 17/408,758

(22) Filed: Aug. 23, 2021

(65) Prior Publication Data

US 2023/0059883 A1     Feb. 23, 2023

(51) Int. Cl.
| | | |
|---|---|---|
| G01S 17/93 | (2020.01) | |
| B60W 40/06 | (2012.01) | |
| G01S 17/89 | (2020.01) | |
| G01S 17/931 | (2020.01) | |
| G06F 18/2135 | (2023.01) | |
| G06F 18/23 | (2023.01) | |
| G06V 10/40 | (2022.01) | |

(52) U.S. Cl.
CPC .......... *G01S 17/931* (2020.01); *B60W 40/06* (2013.01); *G01S 17/89* (2013.01); *G06F 18/2135* (2023.01); *G06F 18/23* (2023.01); *G06V 10/40* (2022.01); *B60W 2420/408* (2024.01); *B60W 2552/00* (2020.02); *B60W 2554/20* (2020.02)

(58) Field of Classification Search
None
See application file for complete search history.

(56) References Cited

U.S. PATENT DOCUMENTS

| | | | |
|---|---|---|---|
| 2014/0245231 A1* | 8/2014 | Cha | G06T 17/10 715/848 |
| 2020/0043186 A1* | 2/2020 | Selviah | G06T 7/33 |

* cited by examiner

*Primary Examiner* — Hovhannes Baghdasaryan
(74) *Attorney, Agent, or Firm* — CANTOR COLBURN LLP

(57) ABSTRACT

A system in a vehicle includes a lidar system to transmit incident light and receive reflections from one or more objects as a point cloud of points. The system also includes processing circuitry to identify feature points among the points of the point cloud, the feature points being horizontal feature points reflected from a horizontal surface or vertical feature points reflected from a vertical surface. The processing circuitry processes the point cloud by obtaining a normal vector corresponding to each of the points of the point cloud. The normal vector includes a first component associated with a first dimension, a second component associated with a second dimension, and a third component associated with a third dimension.

20 Claims, 4 Drawing Sheets

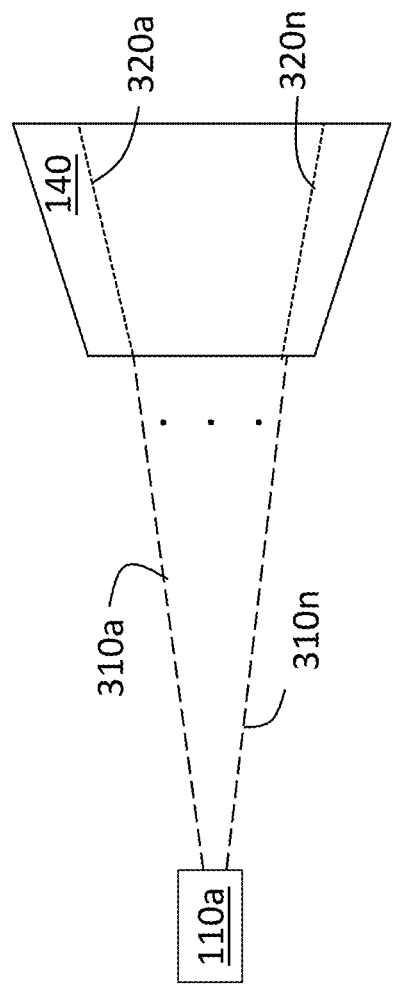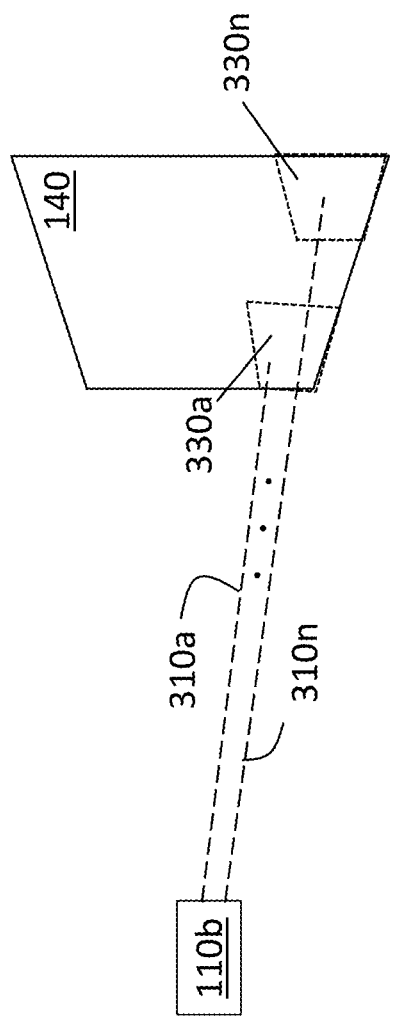
FIG. 3A
FIG. 3B

IDENTIFICATION OF PLANAR POINTS IN LIDAR POINT CLOUD OBTAINED WITH VEHICLE LIDAR SYSTEM

INTRODUCTION

The subject disclosure relates to the identification of planar points in a lidar point cloud obtained with a vehicle lidar system.

Vehicles (e.g., automobiles, trucks, construction equipment, farm equipment) increasingly include sensors that obtain information about the vehicle and its environment. The information facilitates semi-autonomous or autonomous operation of the vehicle. For example, sensors (e.g., camera, radar system, lidar system, inertial measurement unit (IMU), steering angle sensor) may facilitate semi-autonomous maneuvers such as automatic braking, collision avoidance, or adaptive cruise control. A lidar system obtains a point cloud that must be processed to obtain information that would facilitate control of vehicle operation. Accordingly, it is desirable to provide the identification of planar points in a lidar point cloud obtained with a vehicle lidar system.

SUMMARY

In one exemplary embodiment, a system in a vehicle includes a lidar system to transmit incident light and receive reflections from one or more objects as a point cloud of points. The system also includes processing circuitry to identify feature points among the points of the point cloud, the feature points being horizontal feature points reflected from a horizontal surface or vertical feature points reflected from a vertical surface. The processing circuitry processes the point cloud by obtaining a normal vector corresponding to each of the points of the point cloud, the normal vector including a first component associated with a first dimension, a second component associated with a second dimension, and a third component associated with a third dimension.

In addition to one or more of the features described herein, the lidar system is a beam-based lidar system that transmits each beam of incident light across a horizontal scan line.

In addition to one or more of the features described herein, the lidar system is a non-beam-based lidar system that transmits each beam of incident light over an area.

In addition to one or more of the features described herein, the processing circuitry identifies a subset of points associated with each of the points of the point cloud.

In addition to one or more of the features described herein, the processing circuitry performs principal component analysis on the subset of points associated with each of the points of the point cloud to obtain the normal vector corresponding to each of the points of the point cloud.

In addition to one or more of the features described herein, the processing circuitry obtains a subset H of the points of the point cloud for which the first component of the normal vector is below a first threshold value and the second component of the normal vector is below a second threshold value.

In addition to one or more of the features described herein, the processing circuitry identifies the horizontal feature points using a random sample consensus (RANSAC) algorithm on the subset H of the points.

In addition to one or more of the features described herein, the processing circuitry obtains a subset V of the points of the point cloud for which the third component of the normal vector is below a third threshold value.

In addition to one or more of the features described herein, the processing circuitry normalizes directions of the normal vectors of the subset V of the points of the point cloud to obtain normalized directions.

In addition to one or more of the features described herein, the processing circuitry clusters the subset V of the points of the point cloud using spatial clustering of applications with noise (DBSCAN) on the normalized directions and identifies the vertical feature points as those in a predefined number of clusters with a highest density or number of points.

In another exemplary embodiment, a method includes configuring a lidar system to transmit incident light and receive reflections from one or more objects as a point cloud of points. The method also includes configuring processing circuitry to identify feature points among the points of the point cloud, the feature points being horizontal feature points reflected from a horizontal surface or vertical feature points reflected from a vertical surface. The processing circuitry processes the point cloud by obtaining a normal vector corresponding to each of the points of the point cloud. The normal vector includes a first component associated with a first dimension, a second component associated with a second dimension, and a third component associated with a third dimension.

In addition to one or more of the features described herein, the lidar system is a beam-based lidar system that transmits each beam of incident light across a horizontal scan line.

In addition to one or more of the features described herein, the lidar system is a non-beam-based lidar system that transmits each beam of incident light over an area.

In addition to one or more of the features described herein, the configuring the processing circuitry includes identifying a subset of points associated with each of the points of the point cloud.

In addition to one or more of the features described herein, the configuring the processing circuitry includes performing principal component analysis on the subset of points associated with each of the points of the point cloud to obtain the normal vector corresponding to each of the points of the point cloud.

In addition to one or more of the features described herein, the configuring the processing circuitry includes obtaining a subset H of the points of the point cloud for which the first component of the normal vector is below a first threshold value and the second component of the normal vector is below a second threshold value.

In addition to one or more of the features described herein, the configuring the processing circuitry includes identifying the horizontal feature points using a random sample consensus (RANSAC) algorithm on the subset H of the points.

In addition to one or more of the features described herein, the configuring the processing circuitry includes obtaining a subset V of the points of the point cloud for which the third component of the normal vector is below a third threshold value.

In addition to one or more of the features described herein, the configuring the processing circuitry includes normalizing directions of the normal vectors of the subset V of the points of the point cloud to obtain normalized directions.

In addition to one or more of the features described herein, the configuring the processing circuitry includes clustering the subset V of the points of the point cloud using spatial clustering of applications with noise (DBSCAN) on the normalized directions and identifying the vertical feature points as those in a predefined number of clusters with a highest density or number of points.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3A illustrates an exemplary beam-based lidar system that generates a point cloud within which planar points are identified according to one or more embodiments;

FIG. 3B illustrates an exemplary non-beam-based lidar system that generates a point cloud within which planar points are identified according to one or more embodiments.

DETAILED DESCRIPTION

Figure 1:
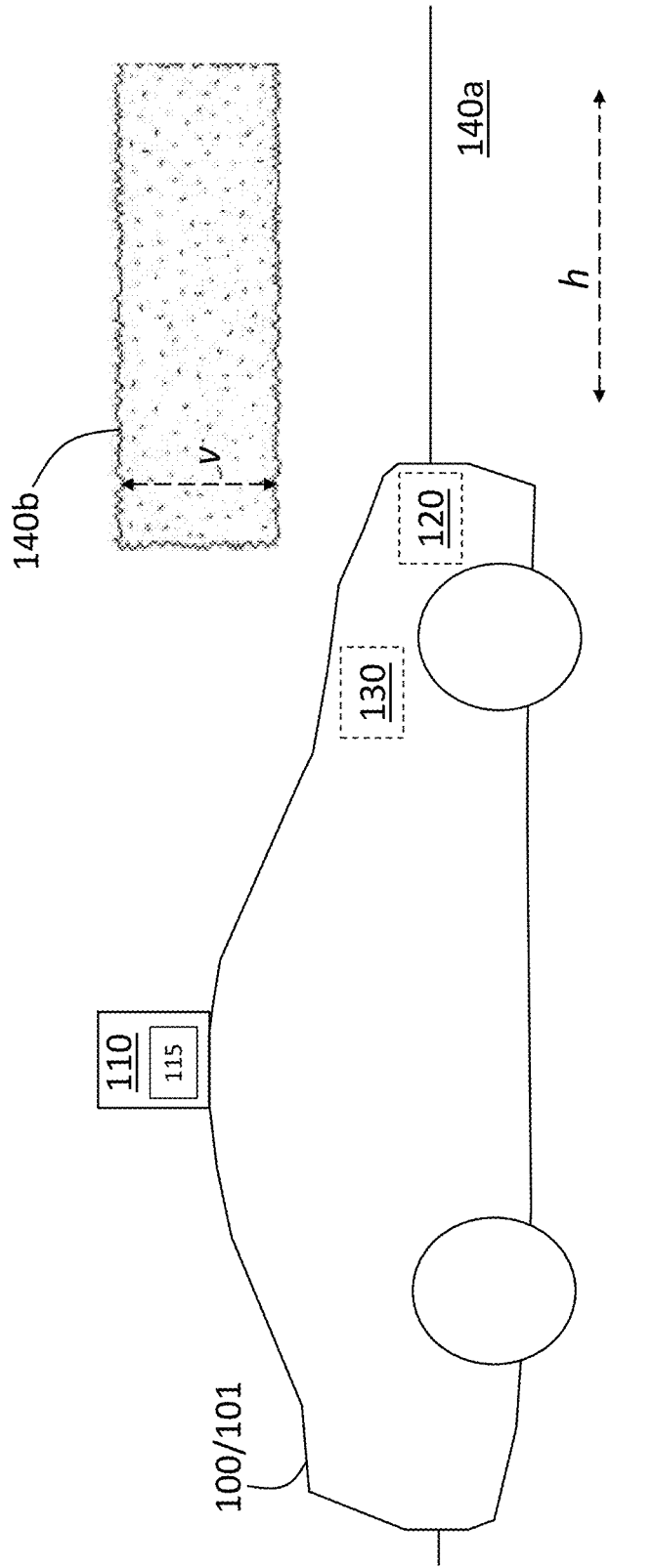
FIG. 1 is a block diagram of a vehicle implementing identification of planar points in a lidar point cloud obtained with a lidar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a point cloud obtained with a lidar system must be processed in order to obtain information about detected objects. The process is referred to as feature extraction. More specifically, feature extraction refers to the identification of features such as edges and planes within the point cloud. The identification of these edges and planes facilitates the identification of objects in the scene. A beam-based point cloud refers to one that is made up of multiple horizontal scan lines corresponding to multiple beams of the light source (e.g., laser) that are transmitted to obtain the point cloud as reflections. That is, each scan line corresponds to a transmitted beam. The vertical resolution of a beam-based point cloud is limited by how close the transmitted beams and, consequently, how close the scan lines are to each other. Thus, another type of point cloud that may be obtained is a non-beam-based point cloud. A non-beam-based point cloud may refer, for example, to a point cloud formed as a patch (e.g., cube) per beam. Such a point cloud does not include the horizontal scan lines that define a beam-based point cloud.

Prior feature extraction techniques (e.g., laser odometry and mapping (LOAM)) are well-suited to beam-based point clouds but rely on the horizontal scan lines and, thus, are unsuited for non-beam-based point clouds. Embodiments of the systems and methods detailed herein relate to the identification of planar points in a lidar point cloud obtained with a vehicle lidar system. That is, feature extraction specific to planes is of interest. Further, the one or more embodiments are equally applicable to beam-based and non-beam-based point clouds.

In accordance with an exemplary embodiment, FIG. 1 is a block diagram of a vehicle 100 implementing identification of planar points in a lidar point cloud obtained with a lidar system 110. The exemplary vehicle 100 shown in FIG. 1 is an automobile 101. The lidar system 110 may be beam-based or non-beam-based, as illustrated in FIGS. 3A and 3B. The lidar system 110 includes a lidar controller 115. The vehicle 100 includes additional sensors 120 (e.g., radar system, camera, IMU) and a controller 130. The controller 130 may obtain information from the lidar system 110 and other sensors 120 and may control semi-autonomous or autonomous operation of the vehicle 100. The numbers and locations of the lidar system 110 and other sensors 120 are not intended to be limited by the exemplary illustration in FIG. 1.

The feature extraction processes discussed for the lidar system 110 may be performed by the lidar controller 115, controller 130, or a combination of the two. The lidar controller 115 and controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 4:
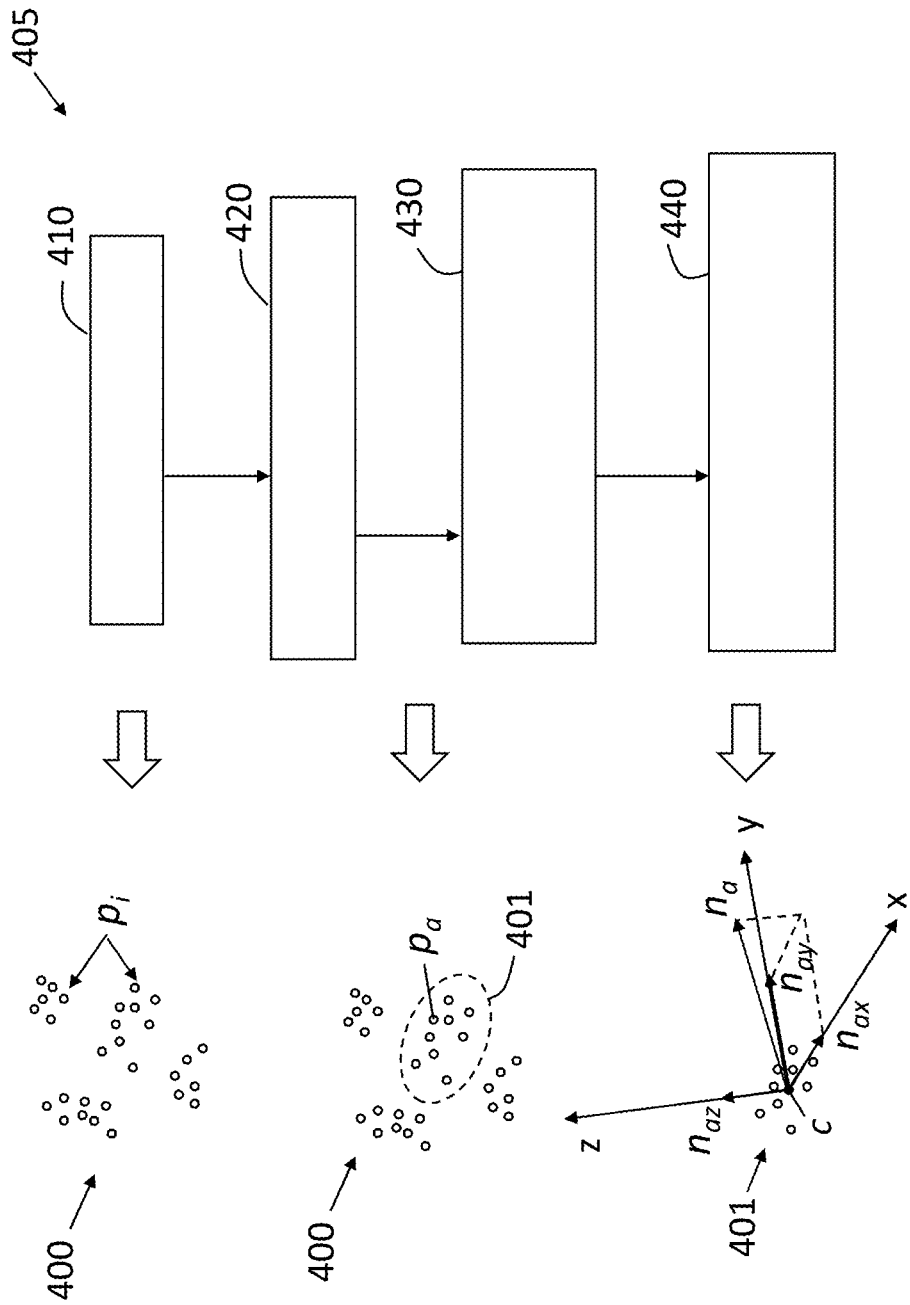
FIG. 4 is a process flow of a method of obtaining normal vectors using principal component analysis as part of the processing described in FIG. 2.

In FIG. 1, two exemplary objects 140a, 140b (generally referred to as 140) in the field of view of the lidar system 110 are shown. The object 140a is a road surface and the object 140b is a hedge row. The lidar system 110 transmits incident light and receives reflected light. The reflected light is a result of reflection of the incident light by different parts of the objects 140 in the field of view of the lidar system 110. The reflected light is in the form of points $p_i$ that form a point cloud 400 (FIG. 4). In order to identify and locate objects 140 within the point cloud 400, the point cloud 400 must be processed. Specifically, feature extraction may be performed as discussed with reference to FIG. 2. The feature extraction results in a set L of feature points. According to the embodiments detailed herein, the feature points indicate which points in the set L are part of a horizontal plane h and which points of the set L are part of a vertical plane v. An exemplary horizontal plane h from which points in the point cloud 400 may be obtained is illustrated by the road surface (object 140a). Similarly, an exemplary vertical plane v from which points in the point cloud 400 may be obtained is illustrated by the hedge row 140b. When the point cloud 400 is obtained, performing feature extraction to identify points that are in a horizontal plane h or a vertical plane v may help to identify the object 140.

Figure 2:
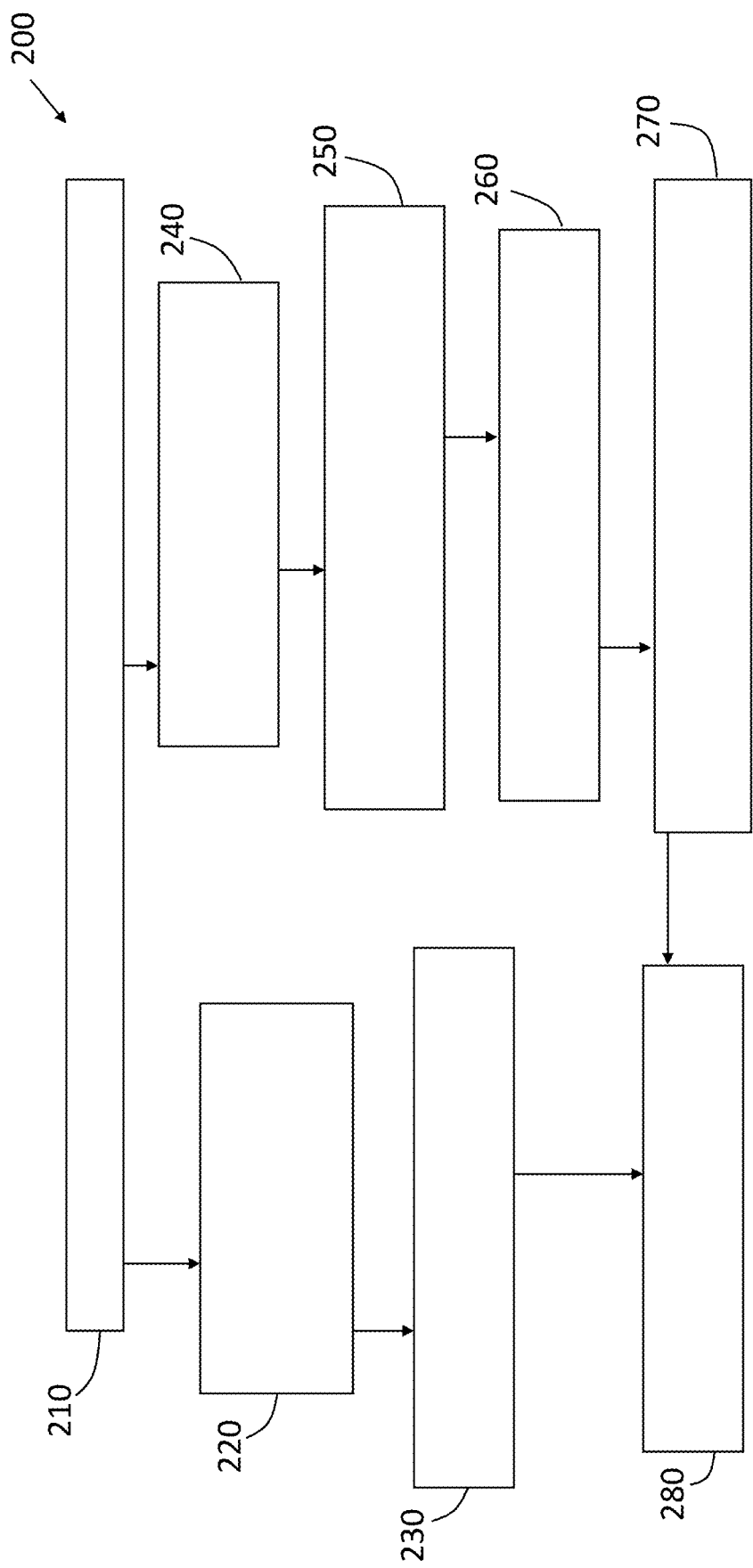
FIG. 2 is a process flow of a method of identifying planar points in a lidar point cloud according to one or more embodiments.

FIG. 2 is a process flow of a method 200 of identifying planar points in a lidar point cloud 400 (FIG. 4) according to one or more embodiments. The point cloud 400 may be obtained by a lidar system 110 of a vehicle 100 and, as previously noted, the processing of the point cloud 400 may be performed by the lidar controller 115, controller 130 of the vehicle 100, or a combination of the two. The point cloud 400 may be a beam-based or a non-beam-based point cloud 400. According to the processes discussed with reference to FIG. 2, a set L of feature points is obtained. The set L of feature points identifies which of the points in the point cloud 400 are part of a horizontal plane h or vertical plane v. When points within multiple horizontal planes h or vertical planes v are present in the point cloud 400, the set L of feature points identifies which horizontal plane h or vertical plane v each point is in.

At block 210, processing is performed iteratively for each point $p_i$ of the point cloud 400. For each point $p_i$ of the point cloud 400, a normal vector $[n_{ix}, n_{iy}, n_{iz}]$ is calculated. The normal vector may be obtained using principal component analysis (PCA), for example. PCA is a known dimensionality-reduction technique and its specific application is briefly described herein with reference to FIG. 4. A normal vector is, by definition, a vector that is perpendicular to the surface at a given point. For each point in the point cloud 400, that surface is not known and is what the processes of FIG. 2 are used to estimate. Thus, obtaining the normal vector for a given point in the point cloud 400 may be based on other points around the given point, as further discussed with reference to FIG. 4. Once the normal vector $[n_{ix}, n_{iy}, n_{iz}]$ is obtained for each point $p_i$ of the point cloud 400, the processes at blocks 220 and 230 are performed to identify points $p_i$ of the point cloud 400 that are part of one or more horizontal planes h, and the processes at blocks 240, 250, 260, and 270 are performed to identify points $p_i$ of the point cloud 400 that are part of one or more vertical planes v.

At block 220, the processes include creating a set H of points among the point cloud 400 for which the following is true based on the corresponding normal vector $[n_{ix}, n_{iy}, n_{iz}]$ for each of the points $p_i$:

$$|n_{ix}| < threshold1 \qquad [EQ. 1]$$

$$|n_{iy}| < threshhold2 \qquad [EQ. 2]$$

Once the set H of points is created at block 220, the processes include extracting horizontal plane points, at block 230. At block 230, a known algorithm, like random sample consensus (RANSAC), may be used to detect outliers in the set H of points and thereby retain only points among the point cloud 400 that are part of a horizontal plane.

At block 240, the processes include creating a set V of points among the point cloud 400 for which the following is true based on the corresponding normal vector $[n_{ix}, n_{iy}, n_{iz}]$ for each of the points $p_i$:

$$|n_{iz}| < threshold3 \qquad [EQ. 3]$$

At block 250, normalizing the directions of the normal vectors for the points $p_i$ in the set V refers to computing:

$$\overline{n}_i = \frac{p_i n_i}{|p_i n_i|} n_i, \text{ where } n_i = [n_{ix}, n_{iy}, n_{iz}] \qquad [EQ. 4]$$

At block 260, the processes include clustering the normalized directions obtained for the points $p_i$ in the set V. This may involve using the known technique of density-based spatial clustering of applications with noise (DBSCAN). A high density cluster represents a set of points whose normal vector directions are close to each other (i.e., within some established distance) within the set V. At block 260, high density clusters of points are separated from low density clusters of points within the set V. At block 270, extracting vertical plane points involves identifying points in the g clusters that are generated at block 260 based on a predefined criteria such as highest density or number of points. At block 280, generating the set L of feature points refers to including the horizontal plane points obtained at block 230 and the vertical plane points obtained at block 270.

FIG. 3A illustrates an exemplary beam-based lidar system 110a and FIG. 3B illustrates an exemplary non-beam-based lidar system 110b. Each of the lidar systems 110a, 110b is shown with an object 140 (e.g., wall) in its field of view. As shown in FIG. 3A, each beam 310a through 310n (generally referred to as 310) results in a horizontal scan line 320a through 320n (generally referred to as 320). Thus, the point cloud 400 formed from reflections of the scan lines 320 would also be in the form of lines with separation in the vertical dimension that corresponds with a separation between adjacent beams 310. As previously noted, this limits the vertical resolution of the beam-based lidar system 110a according to how closely the beams 310 are spaced.

As shown in FIG. 3B, each beam 310 results in an area 330a through 330n (generally referred to as 330) or a patch that is scanned by the beam. Thus, in the non-beam-based lidar system 110b, a horizontal scan is not accomplished by each beam 310 individually, as it is in the beam-based lidar system 110a. As previously noted, prior feature extraction techniques rely on the horizontal scan lines 320 of a beam-based lidar system 110a. According to one or more embodiments, the processes discussed with reference to FIG. 3 are applicable to both beam-based and non-beam based lidar systems 110.

FIG. 4 illustrates aspects of the processes at block 210 of FIG. 2. Specifically, FIG. 4 is a process flow of a method 405 of obtaining normal vectors using PCA as part of the processing described in FIG. 2 (block 210). At block 410, the processes include obtaining a point cloud 400 using the lidar system 110. An exemplary point cloud 400 is shown. As previously noted, the point cloud 400 may be obtained with a beam-based or non-beam-based lidar system 110. At block 420, the processes include selecting one point $p_i$ at a time (i.e., for each iteration of the method 405).

An exemplary point $p_a$ is indicated in FIG. 4 for explanatory purposes. At block 430, the processes include obtaining a subset 401 of points from the point cloud 400 based on the selected point (e.g., point $p_a$). The subset 401 is determined as the selected point $p_a$ and its neighboring points, which are points within a predefined distance of the selected point $p_a$. An exemplary subset 401 corresponding to the selected point $p_a$ is shown in FIG. 4. As previously noted, the normal vector for the selected point $p_a$ may be determined using PCA. That is, at block 440, a center c of the subset 401 is identified, and a normal vector $n_a = [n_{ax}, n_{ay}, n_{az}]$ is obtained for the selected point $p_a$ as the eigenvector with the smallest eigenvalue of the covariance matrix. As discussed with reference to FIG. 2, a normal vector is obtained for each point $p_i$ of the point cloud 400 in this manner. Then, based on the normal vectors, points associated with horizontal and vertical planes are identified as the set L of feature points.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising:
   a lidar system configured to transmit incident light and receive reflections from one or more objects as a point cloud of points;
   processing circuitry configured to identify feature points among the points of the point cloud, the feature points being horizontal feature points reflected from a horizontal surface or vertical feature points reflected from a vertical surface, wherein the processing circuitry is configured to process the point cloud by obtaining a normal vector corresponding to each of the points of the point cloud, the normal vector including a first component associated with a first dimension, a second component associated with a second dimension, and a third component associated with a third dimension; and wherein the processing circuitry is configured to obtain a subset H of the points of the point cloud for which the first component of the normal vector is below a first threshold value and the second component of the normal vector is below a second threshold value.

2. The system according to claim 1, wherein the lidar system is a beam-based lidar system that transmits each beam of incident light across a horizontal scan line.

3. The system according to claim 1, wherein the lidar system is a non-beam-based lidar system that transmits each beam of incident light over an area.

4. The system according to claim 1, wherein the processing circuitry is configured to identify a subset of points associated with each of the points of the point cloud.

5. The system according to claim 4, wherein the processing circuitry is configured to perform principal component analysis on the subset of points associated with each of the points of the point cloud to obtain the normal vector corresponding to each of the points of the point cloud.

6. The system according to claim 1, wherein the processing circuitry is configured to identify the horizontal feature points using a random sample consensus (RANSAC) algorithm on the subset H of the points.

7. The system according to claim 1, wherein the processing circuitry is configured to obtain a subset V of the points of the point cloud for which the third component of the normal vector is below a third threshold value.

8. The system according to claim 7, wherein the processing circuitry is configured to normalize directions of the normal vectors of the subset V of the points of the point cloud to obtain normalized directions.

9. The system according to claim 8, wherein the processing circuitry is configured to cluster the subset V of the points of the point cloud using spatial clustering of applications with noise (DBSCAN) on the normalized directions and to identify the vertical feature points as those in a predefined number of clusters with a highest density or number of points.

10. A method comprising:
configuring a lidar system to transmit incident light and receive reflections from one or more objects as a point cloud of points;
configuring processing circuitry to identify feature points among the points of the point cloud, the feature points being horizontal feature points reflected from a horizontal surface or vertical feature points reflected from a vertical surface, wherein the processing circuitry is configured to process the point cloud by obtaining a normal vector corresponding to each of the points of the point cloud, the normal vector including a first component associated with a first dimension, a second component associated with a second dimension, and a third component associated with a third dimension; and wherein the configuring the processing circuitry includes obtaining a subset V of the points of the point cloud for which the third component of the normal vector is below a third threshold value.

11. The method according to claim 10, wherein the lidar system is a beam-based lidar system that transmits each beam of incident light across a horizontal scan line.

12. The method according to claim 10, wherein the lidar system is a non-beam-based lidar system that transmits each beam of incident light over an area.

13. The method according to claim 10, wherein the configuring the processing circuitry includes identifying a subset of points associated with each of the points of the point cloud.

14. The method according to claim 13, wherein the configuring the processing circuitry includes performing principal component analysis on the subset of points associated with each of the points of the point cloud to obtain the normal vector corresponding to each of the points of the point cloud.

15. The method according to claim 10, wherein the configuring the processing circuitry includes obtaining a subset H of the points of the point cloud for which the first component of the normal vector is below a first threshold value and the second component of the normal vector is below a second threshold value.

16. The method according to claim 15, wherein the configuring the processing circuitry includes identifying the horizontal feature points using a random sample consensus (RANSAC) algorithm on the subset H of the points.

17. The method according to claim 10, wherein the configuring the processing circuitry includes normalizing directions of the normal vectors of the subset V of the points of the point cloud to obtain normalized directions.

18. The method according to claim 17, wherein the configuring the processing circuitry includes clustering the subset V of the points of the point cloud using spatial clustering of applications with noise (DBSCAN) on the normalized directions and identifying the vertical feature points as those in a predefined number of clusters with a highest density or number of points.

19. The system according to claim 2, further comprising limiting a vertical resolution of the beam-based lidar system according to how closely the beams are spaced.

20. The method according to claim 11 further comprising limiting a vertical resolution of the beam-based lidar system according to how closely the beams are spaced.

* * * * *